United States Patent
Gujral

(10) Patent No.: US 11,823,274 B2
(45) Date of Patent: Nov. 21, 2023

(54) PARAMETRIC INSTRUMENTS AND METHODS RELATING TO BUSINESS INTERRUPTION

(71) Applicant: MACHINE COVER, INC., Wenham, MA (US)

(72) Inventor: Inder-Jeet Singh Gujral, Wenham, MA (US)

(73) Assignee: MACHINE COVER, INC., Wenham, MA (US)

( * ) Notice: Subject to any disclaimer, the term of this patent is extended or adjusted under 35 U.S.C. 154(b) by 383 days.

(21) Appl. No.: 16/999,880

(22) Filed: Aug. 21, 2020

(65) Prior Publication Data

US 2020/0380609 A1    Dec. 3, 2020

Related U.S. Application Data

(63) Continuation-in-part of application No. 16/857,213, filed on Apr. 24, 2020, now abandoned, which is a
(Continued)

(51) Int. Cl.
*G06Q 40/08* (2012.01)
*G06F 9/54* (2006.01)
(Continued)

(52) U.S. Cl.
CPC .......... *G06Q 40/08* (2013.01); *G06F 9/542* (2013.01); *G06Q 10/10* (2013.01); *G06Q 50/18* (2013.01)

(58) Field of Classification Search
CPC .. G06Q 30/012; G06Q 30/0234; G06Q 40/08; G06Q 10/10; G06Q 50/18; G06F 9/542
See application file for complete search history.

(56) References Cited

U.S. PATENT DOCUMENTS

| 6,058,102 A | 5/2000 | Drysdale |
| 10,713,727 B1 | 7/2020 | Floyd |

(Continued)

FOREIGN PATENT DOCUMENTS

| CN | 1940988 | 4/2007 |
| CN | 101075316 | 11/2007 |

(Continued)

OTHER PUBLICATIONS

S.C. Hui, "Data Mining for Customer Service Support", 2000, Information & Management 38 (2000), pp. 1-13. (Year: 2000).*

(Continued)

*Primary Examiner* — Tan D Nguyen
(74) *Attorney, Agent, or Firm* — NIXON & VANDERHYE P.C.

(57) ABSTRACT

A parametric instrument is administered by defining a mishap for coverage by the parametric instrument, where the mishap is identifiable and verifiable after occurrence. The system determines when a trigger condition has taken place and confirms activation of the parametric instrument. This determination is practiced by measuring a triggered operating parameter and identifying and confirming when the triggered operating parameter satisfies predetermined trigger criteria. Activation of the parametric instrument is subsequently confirmed, and the corresponding benefit may be processed.

18 Claims, 3 Drawing Sheets

Related U.S. Application Data continuation-in-part of application No. 16/430,547, filed on Jun. 4, 2019, now abandoned.

(60) Provisional application No. 62/680,032, filed on Jun. 4, 2018.

(51) Int. Cl.
 G06Q 10/10 (2023.01)
 G06Q 50/18 (2012.01)

(56) References Cited

U.S. PATENT DOCUMENTS

| | | |
|---|---|---|
| 2001/0037205 A1 | 11/2001 | Joao |
| 2001/0051884 A1 | 12/2001 | Wallis |
| 2002/0038366 A1 | 3/2002 | Harasawa |
| 2002/0065731 A1 | 5/2002 | Schloss |
| 2003/0149657 A1 | 8/2003 | Reynolds |
| 2004/0064351 A1 | 4/2004 | Mikurak |
| 2004/0078290 A1 | 4/2004 | Mester |
| 2004/0186753 A1 | 9/2004 | Kim |
| 2005/0001040 A1 | 1/2005 | Berstis |
| 2005/0137914 A1 | 6/2005 | Schmitter |
| 2007/0288373 A1 | 12/2007 | Wilkes |
| 2008/0103785 A1 | 5/2008 | Logan |
| 2008/0103835 A1 | 5/2008 | Corcoran |
| 2008/0177648 A1* | 7/2008 | Doyle ............... G06Q 30/06 705/1.1 |
| 2009/0303056 A1 | 12/2009 | Bresch |
| 2010/0005004 A1 | 1/2010 | Hudak et al. |
| 2013/0103593 A1 | 4/2013 | Watts |
| 2014/0279450 A1* | 9/2014 | Gujral ............... G06Q 30/04 705/40 |
| 2014/0310186 A1 | 10/2014 | Ricci |
| 2016/0117785 A1* | 4/2016 | Lerick ............... G06Q 50/163 705/305 |
| 2016/0148224 A1* | 5/2016 | Misra ............... G06Q 30/0202 705/7.31 |
| 2016/0148318 A1* | 5/2016 | Moynihan ............ G06Q 40/08 705/4 |
| 2016/0155098 A1 | 6/2016 | McElhinney |
| 2016/0239683 A1* | 8/2016 | Gujral ............... G06F 21/6272 |
| 2016/0359683 A1 | 12/2016 | Bartfai-Walcott |
| 2017/0013011 A1 | 1/2017 | Renouil |
| 2018/0128856 A1 | 5/2018 | Lee et al. |
| 2018/0181144 A1 | 6/2018 | Steinmann |
| 2019/0370814 A1 | 12/2019 | Gujral |

FOREIGN PATENT DOCUMENTS

| | | |
|---|---|---|
| CN | 102083950 | 6/2011 |
| CN | 103077441 | 5/2013 |
| CN | 106461252 | 2/2017 |
| CN | 110276620 A | 9/2019 |
| WO | WO-0215088 A1 * | 2/2002 ............ G06Q 20/02 |
| WO | WO 2007/005975 | 1/2007 |
| WO | WO 2008/016931 | 2/2008 |
| WO | WO-2008050132 A2 * | 5/2008 ............ G06Q 20/02 |
| WO | WO-2008093211 A2 * | 8/2008 ............ G06Q 40/04 |
| WO | WO 2009/051365 | 4/2009 |

OTHER PUBLICATIONS

Selim Aissi, "E-Business Process Modeling: The Next Big Step", May 2002, IEEE, pp. 55-62. (Year: 2002).*

Kuldeep Randhawa, "Credit Card Fraud Detection Using AdaBoost and Majority Voting", Mar. 28, 2018, IEEE Access, vol. 6, pp. 14277-14284. (Year: 2018).*

Jiao Sun, "FraudVis: Understanding Unsupervised Fraud Detection Algorithms," 2018, 2018 IEEE Pacific Visualization Symposium, pp. 170-174. (Year: 2018).*

Cohn, Alan et al., "Smart After All: Blockchain, Smart Contracts, Parametric Insurance, and Smart Energy Grids," Georgetown Law Technology Review, vol. 1:2, 2017, pp. 273-304.

World Elite MasterCard Cardholder Guide to Benefits, Accessed via Wayback Machine: https://web.archive.org/web/20170627160209/https://gif.barclaycardus.com/servicing/img/base/guideBenefits/BAR-5819-1.pdf, Jun. 27, 2017, 44 pp.

U.S. Office Action dated Mar. 30, 2021 issued in U.S. Appl. No. 16/521,293, 33 pp.

U.S. Office Action dated Sep. 13, 2021 issued in U.S. Appl. No. 16/521,293, 42 pp.

International Search Report and Written Opinion dated Nov. 9, 2021 issued in PCT International Patent Application No. PCT/US2021/045527, 20 pp.

Savino, Giovanni et al., "Decision Logic of an Active Braking System for Powered Two Wheelers," 2011, J Automobile Engineering 226(8), (Year: 2011), pp. 1026-1036.

U.S. Office Action dated Nov. 26, 2021 issued in U.S. Appl. No. 16/911,617, 35 pp.

Wang, Lei et al., "On the Brink: Predicting Business Failure with Mobile Location-Based Checkins," (Wang et al.) <Downloaded from the internet: https://www.sciencedirect.com/science/article/abs/pH/S016792361 5000810 ><Downloaded On: Oct. 13, 2021><Date of Publication: Apr. 23, 2015> entire document, especially: fig, 1-2; pp. 4 left col. first paragraph, pp. 7 left col. third paragraph, 11 pp.

U.S. Office Action dated Oct. 5, 2021 issued in U.S. Appl. No. 16/430,547, 35 pp.

U.S. Office Action dated Oct. 5, 2021 issued in U.S. Appl. No. 16/857,213, 34 pp.

Raphael Moura, Learning from Major accidents: Graphical representation and analysis of multi-attribute events to enhance risk communication, Nov. 2017, Safety Science, vol. 99, Part A, pp. 58-70 (Year: 2017).

McLeod, D, Advances in Autonomous Deepwater Inspection, 2013, Offshore Technology Conference, Abstract. (Year: 2013).

Ali Torabi, S. et al., "An Enhanced Risk Assessment Framework for Business Continuity Management Systems," Safety Science 89 (2016), 2016, pp. 201-218.

\* cited by examiner

PARAMETRIC INSTRUMENTS AND METHODS RELATING TO BUSINESS INTERRUPTION

CROSS-REFERENCES TO RELATED APPLICATIONS

This application is a continuation-in-part (CIP) of U.S. patent application Ser. No. 16/857,213, filed Apr. 24, 2020, pending, which is a continuation-in-part of U.S. patent application Ser. No. 16/430,547, filed Jun. 4, 2019, which claims the benefit of U.S. Provisional Patent Application No. 62/680,032, filed Jun. 4, 2018, the entire contents of each of which are herein incorporated by reference.

STATEMENT REGARDING FEDERALLY SPONSORED RESEARCH OR DEVELOPMENT (Not applicable)

BACKGROUND

The invention relates to parametric instruments and, more particularly, to systems and methods for developing and administering a parametric instrument associated with business interruption.

The shortcomings of business interruption in existing commercial insurance policies have come to the fore during the current Covid crisis. In general, as companies have suffered unexpected shortfalls in revenues as well as service-level and employee-benefit implications of laying off employees, they have found that business interruption as currently conceived in commercial policies has tended to fall short.

This has resulted in a variety of negative consequences including an explosion in lawsuits as well as regulatory intervention. While it is expected that commercial insurers will swiftly introduce modified/tightened language in future indemnity policies to better protect themselves, this will not necessarily solve policy holder problems.

SUMMARY

It would be desirable to provide an alternative or supplementary "excess and surplus" (E&S) instrument based on parametric methods. The instrument may be purchased as a separate add-on to a conventional commercial insurance policy.

A parametric instrument is viable where the nature of a "mishap" is defined in advance, and the mechanism by which the occurrence of this mishap can be observed by any interested party is also defined in advance (in other words, the fact of whether the mishap has occurred is not disputable, and it may be verified externally and independently by any interested party).

The parametric instrument of the described embodiments relates to substantial business interruption, for example where a business sees a drop in activity of some predetermined percentage (e.g., 80 percent or more). The predetermined percentage drop is in economic activity in the immediate vicinity of the business, and not necessarily of the business itself. The distinction is significant, because a drop in economic activity in a specific area (e.g. the numbers of motor vehicles traversing this area) can be measured objectively, whereas a specific drop in economic activity at the business itself may be due to a host of reasons that have to do with action/inaction by the business. Therefore, it is possible that an 80% activity drop in the area may mean a 62% drop as far as this business is concerned, or a 91% drop etc. However, in a parametric, there is no concern with the specifics of the drop as experienced by the particular business—the only concern is with drop in activity insofar as it affects all enterprises in the area.

The instrument provides the business owner with a payout or other benefit if the drop in activity exceeds the predefined amount. Because the business interruption event (or "mishap") is readily verifiable and not disputable, there is no claim to process, but can rather be promptly administered. The payout or benefit may be fixed regardless of the percentage of business interruption, or the payout or benefit may alternatively vary by degree of abnormality (beyond the predefined threshold amount).

In an exemplary embodiment, a method of administering a parametric instrument includes the steps of (a) defining a mishap for coverage by the parametric instrument, the mishap being identifiable and verifiable after occurrence; (b) determining when a trigger condition has taken place for which the mishap is applicable and confirming activation of the parametric instrument, the determining step being practiced by measuring a triggered operating parameter and identifying and confirming the trigger condition when the triggered operating parameter satisfies predetermined trigger criteria; (c) after determining the trigger condition and confirming the activation of the parametric instrument, processing a corresponding benefit. The mishap is associated with business interruption of a company, and the trigger condition is defined as a predefined percentage drop in economic activity in the area in which the business is located.

The method may also include defining an economic cell, where steps (a)-(c) are limited to the economic cell. The economic cell may be an area defined within a boundary, such as a 2-mile radius circle around a physical location of the company.

The predefined percentage drop in economic activity may vary by product, and in an exemplary embodiment, the predefined percentage may be 70-80%.

The method may also include measuring a trigger experience; and defining a fee structure for the parametric instrument based on the trigger experience. In this context, measuring the trigger experience may include determining a percentage chance of the trigger condition taking place.

Step (b) may be practiced by performing a trigger scan to determine that the trigger condition has taken place. The step of performing the trigger scan may be practiced by monitoring traffic volume in a vicinity of a physical location of the company. Alternatively or additionally, the step of performing the trigger scan may be practiced by monitoring energy emissions in a vicinity of a physical location of the company.

Step (c) may be practiced by paying a payout to the company. The payout may vary by degree of the percentage drop in economic activity.

In another exemplary embodiment, a method of administering a parametric instrument includes the steps of (a) defining an economic cell in a vicinity of a covered company physical location; (b) defining a mishap for coverage by the parametric instrument, the mishap being identifiable and verifiable after occurrence; (c) determining when a trigger condition has taken place within the economic cell and confirming activation of the parametric instrument, the determining step being practiced by measuring a triggered operating parameter in the economic cell, and identifying and confirming the trigger condition when the triggered operating parameter satisfies predetermined trigger criteria; and (d) after determining the trigger condition and confirming the activation of the parametric instrument, processing a corresponding benefit. Step (c) is practiced by performing a trigger scan within the economic cell to determine that the trigger condition has taken place in the economic cell, and step (d) is practiced by automatically paying the corresponding benefit without requiring a claim from the covered company. The mishap is associated with business interruption of the covered company, and wherein the trigger condition is defined as a predefined percentage drop in economic activity in the economic cell.

BRIEF DESCRIPTION OF THE DRAWINGS

These and other aspects and advantages will be described in detail with reference to the accompanying drawings, in which.

DETAILED DESCRIPTION

A parametric instrument is viable where the nature of the covered event or "mishap" is defined in advance, and the mechanism by which the occurrence of the mishap can be observed by any interested party is also defined in advance. That is, the fact of whether the mishap has occurred is not disputable, and it may be verified externally and independently by any interested party. The parametric instrument of the described embodiments protects companies from losses associated with substantial business interruptions.

Figure 1:
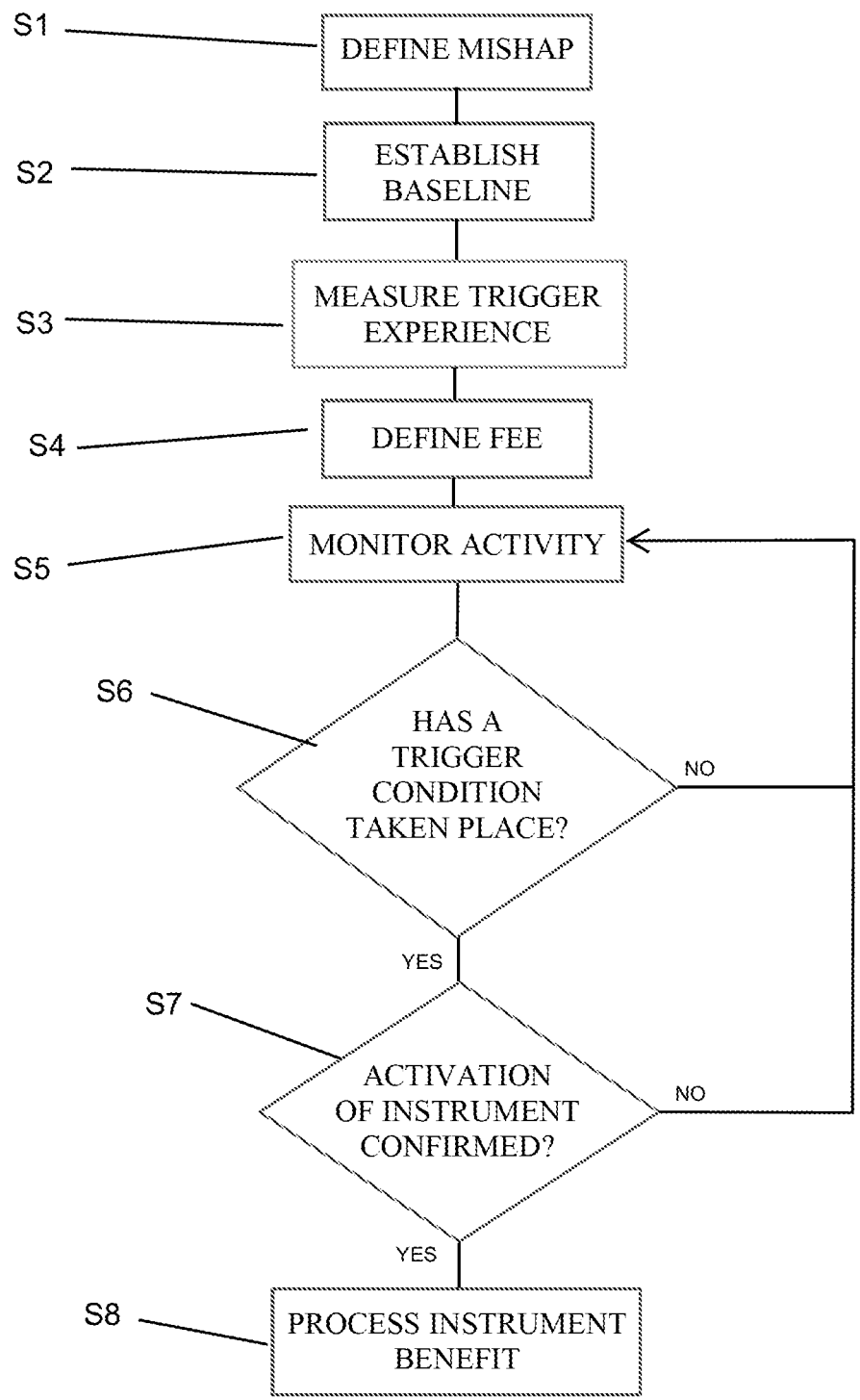
FIG. 1 is a flow diagram showing the methods of administering the parametric instrument according to the described embodiments.
Figure 2:
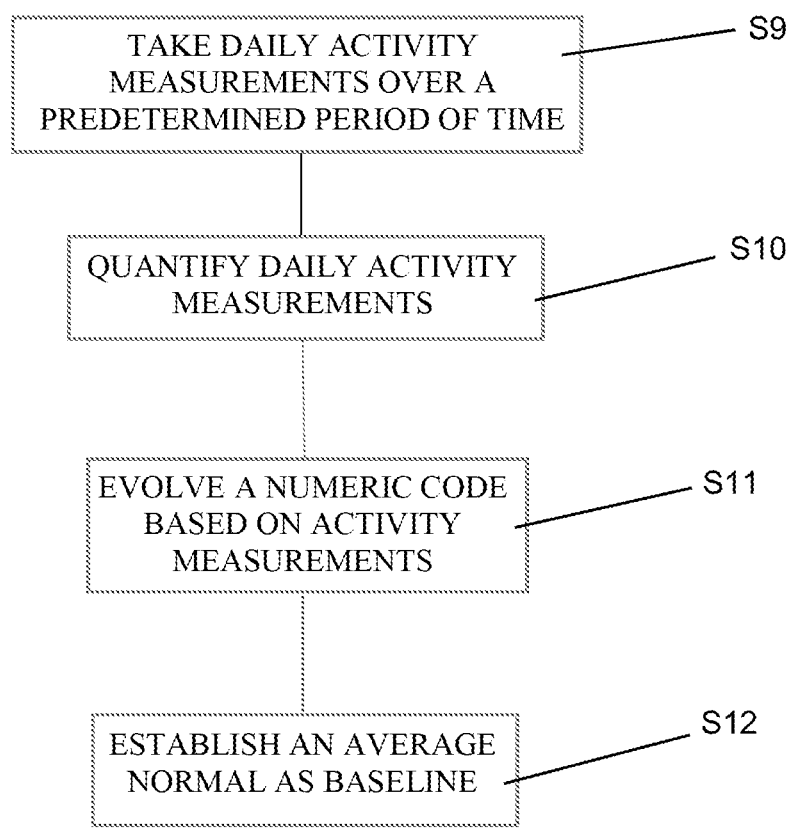
FIG. 2 is flow chart showing a determination of the baseline operating parameter.

FIG. 1 is a flow diagram of the process for administering the parametric instrument. Further details of the process steps are described below. In step S1, a mishap for coverage by the parametric instrument is defined. As noted, the mishap should be identifiable and verifiable after occurrence. A baseline operating parameter for which the mishap is applicable is established (S2). Details of the processes associated with establishing the baseline operating parameter will be described below with reference to FIG. 2.

The parametric does not depend upon a definition of 'normal.' However, in an exemplary embodiment, satellite imagery may be used as the basis for a baseline operating parameter. Each pixel in a given satellite image corresponds to an area of three meters by three meters (3 m×3 m). Thus, the 'color' expressed by the pixel will depend upon what the satellite 'sees' on the ground in that 3×3 space. The system can take, for example, daily measurements of the same area (each satellite photo covers 1 km×1 km) (step S9). If the satellite took a picture each day in calendar 2019, a 'normal' year, the images of course would change, but not in a drastic way. Thus, their variations may be considered 'normal'.

If on the other hand we looked at these images from January 2020 through June 2020, we would see the consequences of sharply decreased activity (i.e., much fewer cars, many fewer people, sharply reduced smoke plumes, 'heat spillage' and so on). This would be 'abnormal'. The daily measurements from step S9 can be quantified (S10), and the system may evolve a numeric code that summarizes what is portrayed in the satellite images (S11). Normalizing the code, it can be assumed that 'average normal' is 100, and 'range of normal" is 75 to 125 (S12).

In step S3, a trigger experience is measured, which enables a fee structure to be defined for the parametric instrument (S4). In order to determine pricing, an "economic cell" (e.g., a boundary area surrounding a covered company's physical location such as a two-mile radius circle) may be established. In some embodiments, measuring the trigger experience involves determining a percentage chance of the trigger condition taking place within the economic cell.

Figure 3:
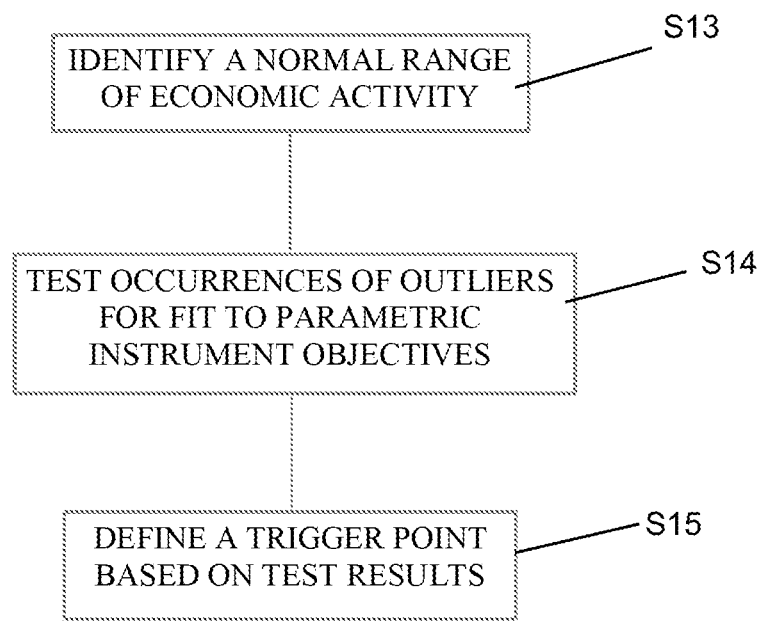
FIG. 3 is a flow chart showing a determination of a percentage chance of triggering the parametric instrument.

With reference to FIG. 3, determination of the percentage trigger chance is a qualitative exercise where the system identifies the normal range (e.g., normalized between 75-125) (step S13), and the system can determine the percentage of time an extreme condition (e.g., 25) occurs, while this extreme condition is highly infrequent and indicative of severe abnormality. For example, the system may test occurrences of outliers with a frequency that fits objectives of the parametric instrument (i.e., the extreme condition) (S14). The system can determine a suitable trigger based on the expected frequency of the severe abnormality, i.e., the percentage chance of the trigger condition (S15).

Historical data can be analyzed to determine the percentage chance. In an exemplary embodiment, historical satellite images can be processed to determine how frequent a predefined trigger condition has taken place over a certain period of time (years, decades, etc.). The data can be run through an artificial intelligence (AI) algorithm in order to estimate the probability of a predefined percentage drop in economic activity for a particular business and/or for the particular economic cell. There are several known AI platforms suitable for analyzing and coordinating the data. An exemplary platform is the SageMaker platform from AWS (Amazon Web Services). The use and functionality of the SageMaker platform are described at https://docs.aws.amazon.com/sagemaker/latest/dg/how-it-works-mlconcept-s.html, the content of which is hereby incorporated by reference.

A calculation is made to determine the percentage chance or probability of a fixed percentage drop in economic activity in the economic cell. For example, it may be determined that there is a 0.005% probability that economic activity within the economic cell will drop by 80% at any time. It is also helpful to determine ranges of normal economic activity. The fee structure for the parametric instrument can be defined based on this data.

In step S5, it is determined whether a trigger condition has taken place for which the mishap is applicable, and activation of the parametric instrument is confirmed. In some embodiments, S5 may be practiced by measuring a triggered operating parameter and identifying and confirming the trigger condition when the triggered operating parameter satisfies predetermined trigger criteria. More specifically, a trigger scan may be performed to determine that the trigger condition has taken place. The system could be predisposed such that a reading of 25 or lower would only rarely occur, and it can be determined that 25 is set as the 'parametric trigger' (based on the normalized "normal" range of 75-125). Thus on a given day, the reading might be 50, which is definitely below the normal range, but not low enough to trigger the parametric. If on the other hand, the reading is 24, then it would be 'acutely abnormal' and more important, it would be less than 25, and therefore, the parametric would trigger and the entity that had purchased the parametric would be paid.

Any objective methodology for determining a drop in economic activity may be used. A color analysis of satellite images is discussed above. Another exemplary methodology for determining a drop in economic activity may include monitoring traffic volume in a vicinity of a physical location of the company using GPS or the like. Alternatively, the trigger scan may be accomplished by monitoring energy emissions in a vicinity of a physical location of the company. Yet another alternative to the use of satellite images to measure economic activity is the use of credit card transaction volume within the economic cell. The system can utilize data from debit/credit card sources to identify and quantify economic activity. For example, assuming card transaction volume of businesses within the economic cell or within an alternative boundary or among a preset number of businesses closest to the instrument holder drops by a certain percentage, the instrument benefit can be triggered. As before, the drop in economic activity should be sustained for a defined period of time before triggering the instrument benefit. Other mechanisms for monitoring economic activity may be utilized, and the invention is not meant to be limited to a particular method.

When a trigger condition has taken place (YES in S6), activation of the parametric instrument is confirmed (S7). After determining the trigger condition and confirming the activation of the parametric instrument, the instrument benefit is processed (S8). In some embodiments, processing the instrument benefit refers to paying a payout to the company. The payout may be fixed or may vary by degree of the percentage drop in economic activity. The formula by which the payout is determined is not in any way related to the triggering mechanism and it may be arbitrarily complex. Examples may be: (1) If economic activity is above X percent, there is no payout; if economic activity is at or below X percent, then the instrument pays out a first amount; and/or for each percent interval below X percent (e.g., 10 percent intervals), the instrument payout is increased by some additional amount.

Because the mishap is objectively identifiable and verifiable after occurrence, there is no dispute or claims adjusters, etc.

The parametric instrument of the described embodiments is suitable as an alternative or supplementary E&S product. The instrument is based on parametric methods and may be marketed as a separate add-on to regular commercial policies.

In an exemplary application, consider an instrument purchaser that has a chain of department stores with 100 locations. The system analyzes indices of economic activity within economic cells around these 100 locations. As noted above, economic activity can be represented via traffic volume measured using GPS or the like, energy emission via satellite imagery, satellite imagery 'color' processing, or other mechanisms. An exemplary economic cell may be a 2-mile radius circle around each of the 100 locations. Using the methodologies described above, taking one location for example, it is determined that the probability of an 80% drop in activity in that economic cell is 0.005%. It is understood that variations in normal economic activity occur, for example by 25%, independent of any action by the instrument purchaser, but the instrument presumes that variations far beyond normal (i.e., abnormality severe enough to cause actual economic pain to the instrument holder) may trigger the parametric instrument.

The parametric instrument provides a benefit to the instrument purchaser any time economic activity at one of their locations drops by a certain amount, for example, 80%, over a certain period of time (e.g., days, weeks, months, etc.). In the event of such a drop in economic activity, the instrument purchaser is provided with an instrument benefit, such as a financial payout. To protect the provider, the instrument may impose payout limits. From the instrument purchaser's viewpoint, if something happens that is out of their control, the instrument purchaser receives a quick 'no-questions' payout that can help with cash-flow or the like while their primary policy may be going through a more detailed and time-consuming claims process.

As another example, consider a barbershop near a large factory. The factory is owned by some company elsewhere. The company decides, for their own reasons, to shut down the factory, causing 100% of the plant's employees to lose their jobs. The barbershop revenue depends substantially on factory workers. With the factory out of commission, the barbershop could see a drop in economic activity exceeding 80%. Traditional indemnity products do not insure against this type of "outside-your-control" drop in revenues. The parametric instrument of the described embodiments provides a payout that relies on the measurement of factors that are external to the particular business. The product is particularly suited for businesses that depend on retail sales of some products or services.

Using satellite imagery can provide access to the entire planet and is particularly suited for relatively densely inhabited areas since it takes fewer images to analyze a target area. The number of images taken by satellite is likely identical in all cases since the resolution is always one pixel per 3x3 meters. Since many more instruments are likely to be sold in a given built-up area, the effective cost of imagery/analysis per sold instrument would be much lower for built-up areas.

As noted, variations may include, for example, sliding-scale payouts that vary by degree of abnormality.

The parametric instrument is applicable to any trigger condition or "mishap" that is identifiable and verifiable after occurrence, where the chances of occurrence can be reasonably estimated. As far as a parametric is concerned, the instrument triggers/pays out upon a particular measured condition being reached. There are no other considerations. In all these cases, the parametric instrument may be regulated as an insurance product or as a warranty instrument or as something else—but that does not affect the basic design of the mechanism nor the technology needed to implement it.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of administering a parametric instrument, the method comprising:
   (a) defining a mishap for coverage by the parametric instrument, the mishap being identifiable and verifiable after occurrence;
   (b) determining when a trigger condition has taken place for which the mishap is applicable and confirming activation of the parametric instrument, the determining step being practiced by measuring a triggered operating parameter and identifying and confirming the trigger condition when the triggered operating parameter satisfies predetermined trigger criteria; and
   (c) after determining the trigger condition and confirming the activation of the parametric instrument, processing a corresponding benefit, wherein the mishap is associated with business interruption of a company, and wherein the trigger condition is defined as a predefined percentage drop in economic activity within an economic cell in which the company is located, wherein step (b) is practiced by identifying credit card transaction volume in the economic cell and converting the credit card transaction volume to a quantification of the economic activity in the economic cell, and (d) wherein the method further comprises comparing the quantification of the economic activity to a baseline value, wherein the triggered operating parameter comprises a predefined drop in the credit card transaction volume that is determined based on the comparison.

2. A method according to claim 1, wherein the economic cell is an area defined within a boundary.

3. A method according to claim 2, wherein the economic cell comprises a 2-mile radius circle around a physical location of the company.

4. A method according to claim 1, wherein the predefined percentage drop in economic activity is 70-80%.

5. A method according to claim 1, further comprising:
measuring a trigger experience; and
calculating a fee structure for the parametric instrument based on the trigger experience.

6. A method according to claim 5, wherein measuring the trigger experience comprises determining a percentage chance of the trigger condition taking place.

7. A method according to claim 1, wherein step (b) is practiced by performing a trigger scan to determine that the trigger condition has taken place.

8. A method according to claim 7, wherein the step of performing the trigger scan is practiced by monitoring traffic volume in a vicinity of a physical location of the company.

9. A method according to claim 7, wherein the step of performing the trigger scan is practiced by monitoring energy emissions in a vicinity of a physical location of the company.

10. A method according to claim 1, wherein step (c) is practiced by paying a payout to the company.

11. A method according to claim 10, wherein in step (c), the payout varies by degree of the percentage drop in economic activity.

12. A method according to claim 1, further comprising defining an economic cell, wherein step (b) is practiced by identifying the credit card transaction volume to identify and quantify the economic activity in the economic cell, and wherein the triggered operating parameter comprises a predefined drop in the credit card transaction volume in the economic cell.

13. A method of administering a parametric instrument, the method comprising:

(a) defining an economic cell in a vicinity of a covered company physical location;

(b) defining a mishap for coverage by the parametric instrument, the mishap being identifiable and verifiable after occurrence;

(c) determining when a trigger condition has taken place within the economic cell and confirming activation of the parametric instrument, the determining step being practiced by measuring a triggered operating parameter in the economic cell, and identifying and confirming the trigger condition when the triggered operating parameter satisfies predetermined trigger criteria; and (d) after determining the trigger condition and confirming the activation of the parametric instrument, processing a corresponding benefit, wherein step (c) is practiced by performing a trigger scan within the economic cell to determine that the trigger condition has taken place in the economic cell, and wherein step (d) is practiced by automatically paying the corresponding benefit without requiring a claim from the covered company, wherein the mishap is associated with business interruption of the covered company, wherein the trigger scan identifies and quantifies economic activity in the economic cell over a predetermined period of time and compares the economic activity to a baseline value, and wherein the trigger condition is defined as a predefined percentage drop in economic activity in the economic cell that is sustained over the predetermined period of time and is determined based on the comparison to the baseline value.

14. A method according to claim 13, wherein the economic cell is an area defined within a boundary.

15. A method according to claim 14, wherein the economic cell comprises a 2-mile radius circle around the company physical location.

16. A method according to claim 13, wherein the predefined percentage drop in economic activity is 70-80%.

17. A method according to claim 13, further comprising:
measuring a trigger experience and determining a percentage chance of the trigger condition taking place; and
defining a fee structure for the parametric instrument based on the trigger experience and the percentage chance.

18. A method according to claim 13, wherein step (c) is practiced by identifying credit card transaction volume to identify and quantify the economic activity in the economic cell, and wherein the triggered operating parameter comprises a predefined drop in the credit card transaction volume in the economic cell.

* * * * *